(12) United States Patent
Arnold

(10) Patent No.: US 6,858,821 B2
(45) Date of Patent: Feb. 22, 2005

(54) METHOD OF ADAPTING AN OPERATING DEVICE TO USER BEHAVIOR AND ADAPTIVE OPERATING DEVICE

(75) Inventor: Georg Arnold, Schwabach (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 0 days.

(21) Appl. No.: 10/442,741

(22) Filed: May 21, 2003

(65) Prior Publication Data

US 2003/0234246 A1 Dec. 25, 2003

(30) Foreign Application Priority Data

Jun. 22, 2002 (DE) .......................................... 102 27 880

(51) Int. Cl.$^7$ ................................................. H05B 3/02
(52) U.S. Cl. ................. 219/483; 219/445.1; 219/444.1; 219/412; 219/414; 219/506; 706/21
(58) Field of Search .............................. 219/483, 445.1, 219/444.1, 412, 414, 506; 706/21

(56) References Cited

U.S. PATENT DOCUMENTS 5,528,018 A * 6/1996 Burkett et al. .............. 219/506
6,355,914 B1 * 3/2002 Stockley ...................... 219/482

* cited by examiner

Primary Examiner—Shawntina Fuqua
(74) Attorney, Agent, or Firm—Laurence A. Greenberg; Werner H. Stemer; Gregory L. Mayback

(57) ABSTRACT

An operating device for an electrical and/or electronic apparatus is adapted to the operating behavior of a user. The apparatus has a plurality of operating states which can be chosen or set by way of the operating device. The selection and/or setting, by the user, of the operating states is stored in a memory. A number of how often a given user input is implemented is ascertained and, for the next selection and/or setting of an operating state, that one which is implemented most frequently is suggested. An operating device for carrying out the method has a memory for storage of the implemented selections and/or settings of operating states, a counter for ascertaining the number of how often a selection and/or a setting is implemented, a calculator for ascertaining the frequency of a selection and/or setting and a comparator for ascertaining the most frequently implemented selection and/or settings.

18 Claims, 2 Drawing Sheets

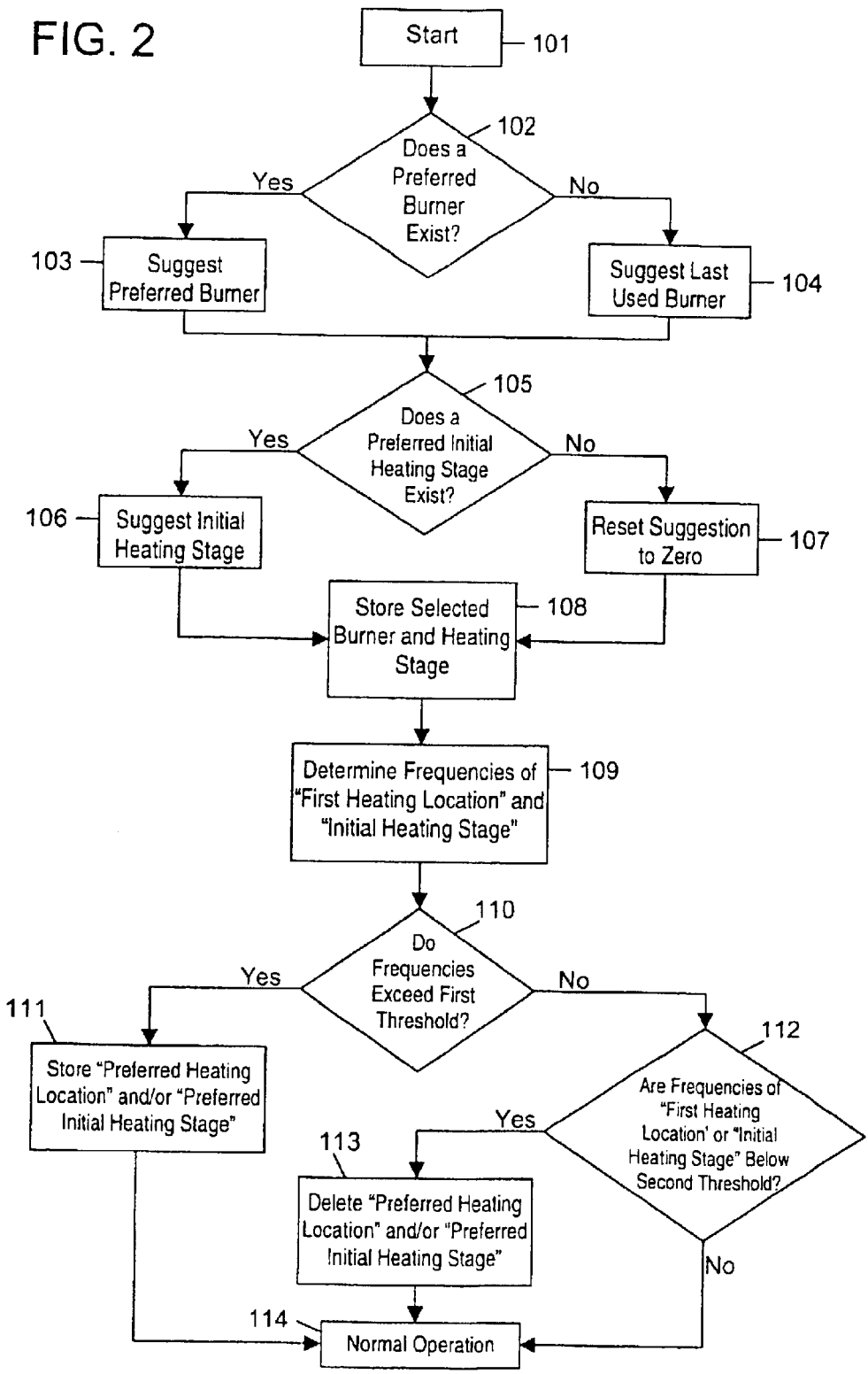

METHOD OF ADAPTING AN OPERATING DEVICE TO USER BEHAVIOR AND ADAPTIVE OPERATING DEVICE

BACKGROUND OF THE INVENTION

Field of the Invention

The invention concerns a method of adapting an operating device belonging to an electrical and/or electronic apparatus to the operating behavior of a user, wherein the electrical/electronic apparatus has a plurality of operating states which can be set by way of the operating device. The invention further pertains to an operating device for carrying out the method.

In prior art operating devices for electrical and/or electronic apparatuses, which have a plurality of operating states, the user, when bringing the apparatus into operation, is always presented with the same operating state or the last-selected operating state, for selection and setting. Thus for example in the case of stove and oven timer switches the individual operating states consisting of clock time, timer, operating duration and end of operating time are selected by pressing a single push-button switch once or a plurality of times. After the push-button switch has been first pressed, the same operating state (for example, the timer) is always presented, or the operating state which was last adopted in a previous operation is presented. In order to be able to select and set other operating states the user is forced to actuate the push-button switch a plurality of times.

Likewise when switching on a stove control configuration for a stove, which is actuated with, say, touch-sensitive switches, it is always the same burner or hotplate (for example, front left) or however also the burner that was last used, that is proposed. If the user wishes to employ another burner he first has to select that burner by possibly multiple presses of a push switch before he can set the desired heating output.

A disadvantage with the specified state of the art is that the presentation of an operating state which is to be selected and set is independent of which operating state the user, on the basis of his habits, usually first selects and sets when he brings the apparatus into operation.

SUMMARY OF THE INVENTION

It is accordingly an object of the invention to provide a method of adapting an operating device to the operating behavior of a user and to provide a corresponding operating device which overcome the above-mentioned disadvantages of the heretofore-known devices and methods of this general type and which simplifies the operation for the user according to the user behavior or user habits.

With the foregoing and other objects in view there is provided, in accordance with the invention, an adaptive method in an electrical/electronic apparatus having a plurality of operating states and an operating device for operating the apparatus. The novel method is a method of adapting the operating device to an operating behavior of a user and it comprises the following steps:

storing user input with a selection and/or a setting of the operating states in a memory;

ascertaining a number how often a given user input with the selection or the setting is implemented and determining a most frequent operating state; and for a next user input with a selection or a setting of an operating state, suggesting the most frequent operating state.

The primary underlying concept of the invention is that, whenever the user brings the electrical/electronic apparatus or appliance into operation, the user receives the presentation for selection and/or setting of that operating state which he has previously most frequently used. In that respect it can be provided that this occurs only when the frequency of selection or setting of the operating state lies above a first threshold value, that is to say above a preset percentage. If the frequency of no operating state selection and/or setting is above that first threshold value, a fixedly preset selection or setting or also the selection or setting last involved is suggested.

In accordance with a development of the invention, there is provided a second threshold value which is lower than the first threshold value. When the frequency falls below that second threshold value the procedure switches over from a presentation of the most frequently effected selection or setting to a presentation of a fixedly preset selection or setting or the last-implemented selection or setting again. Due to the fact that the second threshold value is lower than the first one, there is a hysteresis effect which ensures that, in the case of frequency values near the threshold values, the procedure is prevented from frequently switching over between presentation of the most frequently implemented selection/setting and the presentation of the preset or the last-implemented selection/setting, which could greatly confuse the user.

In a preferred embodiment the first threshold value is 90% and the second threshold value is 70%.

With the above and other objects in view there is also provided, in accordance with the invention, a user-adaptive operating device for an electrical and/or electronic apparatus having a plurality of operating states to be selected or set with the operating device. The device comprises:

a memory for storing user input with at least one of implemented selections and settings of operating states;

a counter for ascertaining a number of how often a given user input with one of a selection and a setting is implemented;

a calculator connected to the counter for ascertaining a frequency of a user input with one of a selection and a setting; and a comparator for ascertaining a most frequently implemented user input with one of a selection and a setting, and for issuing a signal usable for adapting the operating device to a user behavior as outlined in the method summarized above.

In other words, an operating device for carrying out the method has a memory for storage of the effected selections and/or settings of operating states, a counter for ascertaining the number of how often a selection and/or a setting is implemented, a calculator for ascertaining the frequency of a selection and/or setting and a comparator for ascertaining the most frequently implemented selection and/or setting.

In addition a preferred embodiment of the invention provides a discriminator which decides whether the frequency of a selection and/or setting has exceeded the first threshold value or has fallen below the second threshold value.

An embodiment of the invention provides that the operating device is a stove control configuration for a stove, that the operating states are the number of the various heating zones, in particular the burners of the stove, and that setting of the operating state is the input of the heating output for the selected heating zone.

An alternative embodiment of the invention provides that the operating device is a timer switch for a stove, that the operating states are the various switching programs (in particular clock time, timer time, operating duration and end of operating time) of the timer switch and that setting of the operating state is the input of a time value for the selected switching program.

The invention provides that, when the apparatus is brought into operation, the user is first presented with that operating state for selection and/or that setting of that operating state, which the user employs most frequently according to his habits.

Other features which are considered as characteristic for the invention are set forth in the appended claims.

Although the invention is illustrated and described herein as embodied in an adaptation of an operating device to user behavior, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is flow chart and block diagram of the method according to the invention.

DESCRIPTION OF THE PREFERRED EMBODIMENTS

Figure 1:
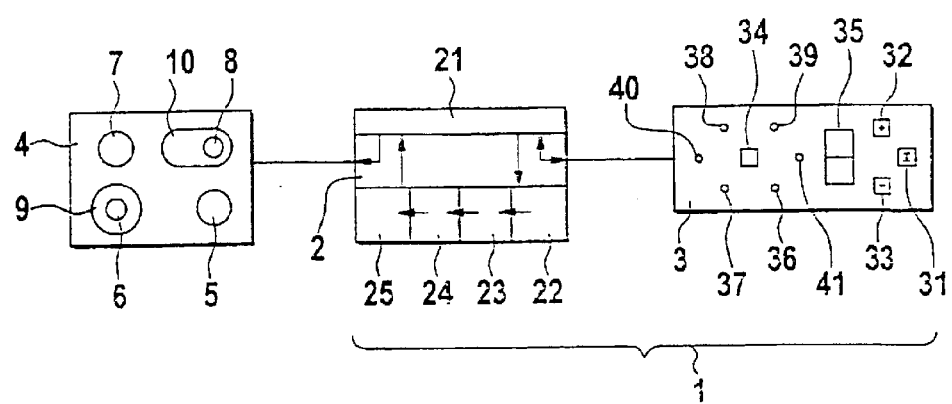
FIG. 1 is a schematic block diagram for a stove control configuration of a cooktop.

Referring now to the figures of the drawing in detail and first, particularly, to FIG. 1 thereof, there is shown a stove control configuration 1 which comprises a control unit 2 and an operating unit 3. The control configuration 1 serves to control the cooktop 4 which has burners 5 to 8 with a dual-circuit supply configuration 9 and a frying supply configuration 10. The control unit 2 has a memory 21, a counter 22, a calculator 23, a comparator 24 and a discriminator 25 which can all or also only in part be formed in an IC or a microcontroller and the mode of operation of which will be described hereinafter. The operating element 3 has a push-button switch 31, a plus button or switch 32, a minus button or switch 33 and a burner selection switch 34. It furthermore has a seven-segment display 35, display lamps 36 to 39 respectively associated with the burners 5 to 8, and display lamps 40 and 41 associated with the dual-circuit supply configuration 9 and the frying supply configuration 10.

Reference will now be had to FIG. 2: After the stove control configuration is switched on by way of the switch 31 (start 101), an inquiry is made at step 102 as to whether a preferred cooking location is stored in the memory 21. If that is the case then that cooking location (for example the burner 6 with the extendable field, i.e., the dual-circuit supply configuration 9) is selected at step 103 and the corresponding display lamps 37 and 40 light up. If no preferred cooking location is stored the cooking location last used (for example the burner 5) is switched on at step 104.

An inquiry is now made in the query step 105 whether, in relation to the cooking location which has been switched on, a preferred initial heating stage is stored in the memory 21. If that is the case, step 106 indicates that in a flashing mode at the seven-segment display 35 and enables confirmation through an actuation of the plus button 32, whereby then the selected cooking location is heated at that initial heating stage. If no preferred initial heating stage is stored in the memory 21 (or if the suggestion is not confirmed after a certain time) the heating stage for the selected cooking location is set to zero at step 107. In both cases the heating stage can be increased or reduced with the buttons 32 and 33 respectively. Also, it is possible to select a cooking location other than the suggested cooking location (for example the burner 8 without the frying supply extension 10), by pressing the button 34, possibly a plurality of times.

The cooking location which is actually selected and the initial heating stage actually set are stored in the memory 21 at step 108. Now the frequencies for the 'first selected cooking location after switching on' and for the 'initial heating stage for the respective cooking location' are freshly ascertained at step 109. For that purpose the counter 22 ascertains how often each cooking stage (in each case with and without the dual-circuit supply configuration or the frying supply configuration) was selected as the first cooking location after the stove control configuration was switched on and how often the various cooking stages for the individual cooking locations were set as the initial heating stages. From the result, the calculator 23 ascertains the relative frequencies for the various cooking locations and initial heating stages and the comparator 24 ascertains therefrom the respectively most frequently selected 'first cooking location' or 'initial heating stage'. In the discriminator 23, a decision is made as to whether those frequencies are above a first threshold value of 90%, that is to say whether in 90% of the cases after the stove control configuration 1 is switched on the 'most frequent first cooking location' is selected or in 90% of the cases for a cooking location the 'most frequent initial heating stage' (for each cooking location separately or jointly over all cooking locations) is set. If that is the case the preferred cooking location or the preferred initial heating stage respectively is stored in the memory 21. If that is not the case, a further check is made in the discriminator 25 as to whether the frequency in respect of the preferred cooking location and the preferred initial heating stage respectively has fallen below a second threshold value of 70%.

If that is the case, the preferred cooking location or the preferred initial heating stage respectively is erased from the memory 21 at step 113.

Thus, when the stove control configuration is next switched on, the memory 21 of the control unit 2 stores the 'first cooking location after switching on' and 'initial heating stage', which is currently adapted to the behavior of the user at step 111. In order to eliminate statistical uncertainties and, related thereto, severe fluctuations in the frequencies, it can be provided that the preferred cooking location and the preferred initial heating stage are stored only after a minimum number of, say, ten switch-on operations in respect of the stove control configuration.

The described method can also be transferred to other control configurations, thus for example to timer switches or stove timer switches. In regard to those, the configuration ascertains which of the various switching programs the user preferably uses and which time values he most frequently inputs for the individual switching programs. In this case also those preferred data are stored. Upon the activation of the timer switch, that switching program which is most frequently used by the user is suggested first. Likewise, when selecting the various switching programs, the respective time value which has been most frequently inputted by the user for that program is suggested. Likewise there is a built-in hysteresis effect so that preferred settings are only stored when the frequency thereof is above a higher first threshold value and they are erased again only when the frequency thereof falls below a lower second threshold value.

In general it is further possible for a sequence of the operating states and/or the respective settings to be established in accordance with the relative frequency thereof and for those operating states or settings to be suggested to the user in accordance with that sequence, so that the user is first presented with the most frequent selection or setting, then the second most frequent, thereafter the third most frequent, and so forth.

In addition it is possible to check whether a user, after switching on the apparatus, frequently selects again the operating state which was previously last selected. Then in future it is always the last-selected operating state that is presented to him. It is possible to proceed likewise with the setting values. If it is established that a user does not have any preferred operating state but changes very often and uses all operating states, it is also possible to begin with an operating state which is fixedly established as standard.

In addition it is also possible for the presented suggestion to be switched over between three alternatives (fixedly preset operating state, last-set operating state, most frequently used operating state), which again also can be applied in regard to the presentation of the setting values.

I claim:

1. In an electrical/electronic apparatus having a plurality of operating states and an operating device for operating the apparatus, a method of adapting the operating device to an operating behavior of a user, which comprises:

storing user input selected from the group consisting of a selection and a setting of the operating states in a memory;

ascertaining a number how often a given user input with the selection or the setting is implemented and determining a most frequent operating state; and for a next user input with a selection or a setting of an operating state, suggesting the most frequent operating state.

2. The method according to claim 1, which comprises determining a first threshold value for a frequency of an implemented user input, and suggesting either a preset user input or a last-implemented user input with a selection or setting if the frequency of no user input with a selection or setting lies above the first threshold value, and suggesting a most frequently implemented user input with a selection or setting when the frequency thereof exceeds the first threshold value.

3. The method according to claim 2, which comprises determining a second threshold value below the first threshold value, and suggesting the most frequently implemented user input with a selection or setting as long as the frequency thereof is still above the second threshold value, and suggesting the preset user input or the last-implemented user input with a selection or setting if the frequency of the user input with the selection or setting falls below the second threshold value.

4. The method according to claim 3, which comprises setting the first threshold value at 90% and setting the second threshold value at 70%.

5. The method according to claim 1, wherein the operating device is a stove control configuration for a stove;

the storing step comprises storing how often various heating zones of the stove are selected and various heating power outputs are inputted for the various heating zones; and the suggesting step comprises, when the stove control configuration is switched on, suggesting the heating zone or heating power output that were most frequently selected or inputted.

6. The method according to claim 5, wherein the stove has a plurality of burners, the storing step comprises storing how often the various burners of the stove.

7. The method according to claim 5, wherein the stove has a plurality of burners with defined heating power output, and the initial heating power outputs are inputted for the various heating zones.

8. The method according to claim 5, which comprises suggesting the most frequently selected heating zone or set heating output only when the frequency exceeds the first threshold value and until the frequency falls below the second threshold value.

9. The method according to claim 1, wherein the operating device is a timer switch for a stove;

the storing step comprises storing how often various switching programs of the timer switch are selected or various time values for the various switching programs are inputted; and upon a selection of switching programs, firstly suggesting the switching program or the time value which was most frequently selected or inputted.

10. The method according to claim 9, wherein the switching programs of the stove are selected from the group consisting of a clock time, a timer time, an operating duration, and an end of operating time.

11. The method according to claim 9, which comprises suggesting the most frequently selected switching program or set time value only when the frequency exceeds the first threshold value and until the frequency falls below the second threshold value.

12. A user-adaptive operating device for an electrical and/or electronic apparatus having a plurality of operating states to be selected or set with the operating device, comprising:

a memory for storing user input with at least one of implemented selections and settings of operating states;

a counter for ascertaining a number of how often a given user input with one of a selection and a setting is implemented;

a calculator connected to said counter for ascertaining a frequency of a user input with one of a selection and a setting; and a comparator for ascertaining a most frequently implemented user input with one of a selection and a setting, and for issuing a signal usable for adapting the operating device to a user behavior in accordance with the method according to claim 1.

13. The operating device according to claim 12, which further comprises a discriminator for deciding whether the frequency of a user input with one of a selection and a setting lies below or above the first threshold value or lies above or below the second threshold value.

14. The operating device according to claim 13 configured as a stove control configuration for a stove with a number of heating regions, wherein the operating states refer to a heating of said heating regions, wherein a selection of an operating state is a selection of a given heating region, and a setting of an operating state is an input defining a heating power output for the given heating region.

15. The operating device according to claim 14, wherein the stove has a plurality of burners and the selection of a given heating region sets a heating power output for a given burner.

16. The operating device according to claim 12 configured as a timer switch for a stove, wherein the operating states are various switching programs of the timer switch, the selection of an operating state is a selection of a switching program and the setting of an operating state is an input of a time value for the selected switching program.

17. The operating device according to claim 16, wherein the switching programs of the timer are selected from the group consisting of a clock time, a timer time, an operating duration, and an end of operating time.

18. In an electrical/electronic apparatus having a plurality of operating states and an operating device for operating the apparatus, a method of adapting the operating device to an operating behavior of a user, which comprises:

storing user input selected from the group consisting of a selection and a setting of the operating states in a memory;

ascertaining a preferred user input with the selection or the setting of an operating state; and for a following user input with a selection or a setting of an operating state, suggesting the preferred user input for the selection or the setting of the operating state.

* * * * *